United States Patent
Fujita et al.

(10) Patent No.: US 11,708,091 B2
(45) Date of Patent: Jul. 25, 2023

(54) VEHICLE TRAVELING CONTROL SYSTEM AND VEHICLE CONTROL SYSTEM

(71) Applicant: Toyota Jidosha Kabushiki Kaisha, Toyota Aichi-ken (JP)

(72) Inventors: Kazuyuki Fujita, Gotemba (JP); Yoshinori Watanabe, Isehara (JP); Takayuki Goto, Yokohama (JP); Masahiro Harada, Hadano (JP); Nobuhide Kamata, Susono (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 80 days.

(21) Appl. No.: 17/098,808

(22) Filed: Nov. 16, 2020

(65) Prior Publication Data
US 2021/0146956 A1  May 20, 2021

(30) Foreign Application Priority Data
Nov. 18, 2019 (JP) .................. 2019-207800

(51) Int. Cl.
| | | |
|---|---|---|
| *B60W 60/00* | (2020.01) | |
| *G08G 1/16* | (2006.01) | |
| *B60W 50/00* | (2006.01) | |
| *B60W 30/095* | (2012.01) | |
| *B60W 50/14* | (2020.01) | |
| *G01C 21/34* | (2006.01) | |
| *B60W 30/09* | (2012.01) | |

(52) U.S. Cl.
CPC ........ *B60W 60/0015* (2020.02); *B60W 30/09* (2013.01); *B60W 30/0956* (2013.01); *B60W 50/0097* (2013.01); *B60W 50/14* (2013.01); *G01C 21/3461* (2013.01); *G08G 1/16* (2013.01)

(58) Field of Classification Search
CPC ......... B60W 30/0956; B60W 60/0015; B60W 30/09; B60W 50/0097; B60W 50/14; G08G 1/16; G01C 21/3461
See application file for complete search history.

(56) References Cited

U.S. PATENT DOCUMENTS 9,105,190 B2  8/2015  Akiyama
9,393,960 B2  7/2016  Kodaira
(Continued)

FOREIGN PATENT DOCUMENTS

| JP | 2009-157502 A | 7/2009 |
| JP | 2016-203882 A | 12/2016 |
| JP | 2019170312 A | 10/2019 |

*Primary Examiner* — Tarek Elarabi
(74) *Attorney, Agent, or Firm* — Dinsmore & Shohl LLP

(57) ABSTRACT

A vehicle traveling control system according to the example in the present disclosure communicates with an automatic operation control system which drafts a traveling plan of the vehicle, and performs an automatic traveling control for automatically running the vehicle along the traveling plan received from the automatic operation control system. The vehicle traveling control system predicts a risk based on information about surrounding environment of the vehicle, and performs, when the risk is predicted, a risk avoidance control to intervene in the automatic traveling control in order to avoid the risk. When the risk avoidance control is executed, the vehicle traveling control system transmits information on the risk avoidance control to the automatic operation control system.

6 Claims, 11 Drawing Sheets

(56) References Cited

U.S. PATENT DOCUMENTS

| | | |
|---|---|---|
| 9,405,727 B2 | 8/2016 | Nagata |
| 9,483,945 B2 | 11/2016 | Okita et al. |
| 9,669,760 B2 | 6/2017 | Hanita et al. |
| 9,873,412 B2 | 1/2018 | Moriizumi |
| 9,898,929 B2 | 2/2018 | Harada et al. |
| 9,965,955 B2 | 5/2018 | Fujishiro |
| 10,793,147 B2 | 10/2020 | Kaminade et al. |
| 10,946,830 B2 | 3/2021 | Sawai et al. |
| 11,175,673 B2 | 11/2021 | Eshima |
| 2009/0162825 A1 | 6/2009 | Sakai et al. |
| 2016/0313738 A1 | 10/2016 | Kindo et al. |
| 2018/0284789 A1* | 10/2018 | Oguro ............... B60W 50/0097 |
| 2019/0361442 A1* | 11/2019 | Izaki .................... G05D 1/0088 |

* cited by examiner

VEHICLE TRAVELING CONTROL SYSTEM AND VEHICLE CONTROL SYSTEM

CROSS-REFERENCE TO RELATED APPLICATION

The present application claims priority under 35 U.S.C. § 119 to Japanese Patent Application No. 2019-207800, filed Nov. 18, 2019. The contents of this application are incorporated herein by reference in their entirety.

TECHNICAL FIELD

The present disclosure relates to a vehicle traveling control system and a vehicle control system for use in an automatic operation vehicle.

BACKGROUND

JP2016-203882A discloses a conventional art for creating a traveling plan of a vehicle based on target route and peripheral information by a travel planning unit and for automated driving the vehicle based on a traveling plan by a traveling control unit. The travel planning unit generates a target track which is a locus in which the vehicle travels in the target route as the traveling plan. At this time, the travel planning unit generates the target track of the vehicle based on the situation of an obstacle around the vehicle so as to avoid contact with the obstacle. The travel planning unit and the traveling control unit may be included in different ECUs.

In the conventional art disclosed in JP2016-203882A, the traveling plan is drafted in consideration of the presence of an obstacle. However, it is difficult to respond to risk caused by unexpected sudden movement of an obstacle or sudden appearance of an obstacle (such as a sudden stop of a preceding vehicle, and a pedestrian jumping out in front of the vehicle) by the traveling plan. As a technique for avoiding a collision with an obstacle, a risk avoidance control for avoiding a risk by intervening in a traveling control of the vehicle is known. An example of the risk avoidance control is PCS (Pre-Crash Safety). When an obstacle with a possibility of collision is detected, the PCS avoids the collision with the obstacle by decelerating or stopping the vehicle by automatic brake control or by changing the traveling direction of the vehicle by automatic steering control.

In case where the risk avoidance control such as the PCS is applied to the conventional art described in JP2016-203882A, the automatic traveling control is usually performed based on the traveling plan. The risk avoidance control intervenes in the automatic traveling control, when the obstacle with the possibility of the collision is detected. The risk avoidance control and the automatic traveling control need to be well coordinated.

SUMMARY

An example of the present disclosure has been made in view of the above problems, and an object thereof is to cooperate the risk avoidance control and the automatic traveling control when automatically controlling the traveling of the vehicle.

First, a vehicle traveling control system according to the example in the present disclosure will be described. A vehicle traveling control system according to the example in the present disclosure controls a vehicle which performs automatic operation. The vehicle traveling control system includes an ECU which operates in accordance with one or more programs. The ECU executes the following operations by executing one or more programs. As a first operation, the ECU communicates with an automatic operation control system which drafts a traveling plan of the vehicle. As a second operation, the ECU performs automatic traveling control for automatically running the vehicle along the traveling plan received from the automatic operation control system. As a third operation, the ECU predicts a risk based on information about surrounding environment of the vehicle. As a fourth operation, when the risk is predicted, the ECU performs a risk avoidance control to intervene in the automatic traveling control so as to avoid the risk. As a fifth operation, the ECU transmits information on the risk avoidance control to the automatic operation control system when the risk avoidance control is executed.

According to the vehicle traveling control system having the above configuration, when the risk is predicted, it is possible to avoid the risk by executing the risk avoidance control. Further, it is possible to transmit the information on the risk avoidance control to the automatic operation control system from the vehicle control system. The automatic operation control system drafts the traveling plan after the risk avoidance control is executed based on the information on the risk avoidance control.

In the vehicle traveling control system having the above configuration, when executing the risk avoidance control, the ECU may transmit, as information relating to the risk avoidance control, notification of execution of the risk avoidance control to the automatic operation control system. Accordingly, it is possible to inform the fact that the risk avoidance control is executed from the vehicle traveling control system to the automatic operation control system.

Next, a vehicle control system according to an example in the present disclosure will be described. A vehicle control system according to the example in the present disclosure includes one or more in-vehicle sensors for acquiring information about peripheral environment of a vehicle. The vehicle control system automated controls running of the vehicle based on information acquired from the one or more in-vehicle sensors. The vehicle control system includes one or more ECUs which operate by one or more programs. The one or more ECUs operate as a traveling plan drafting unit, an automatic traveling control unit, and a risk avoidance control unit by execution of the one or more programs. The traveling plan drafting unit drafts the traveling plan of the vehicle based on input information including the information obtained from at least one of the one or more in-vehicle sensors. The automatic traveling control unit performs an automatic traveling control for automatically running the vehicle along the traveling plan. The risk avoidance control unit predicts a risk based on the information obtained from at least one of the one or more in-vehicle sensors. When the risk is predicted, the risk avoidance control unit performs risk avoidance control to intervene in the automatic traveling control so as to avoid the risk.

When the risk avoidance control is executed, the risk avoidance control unit inputs information on the risk avoidance control to the traveling plan drafting unit.

According to the vehicle control system having the above configuration, it is possible to avoid the predicted risk by executing the risk avoidance control and to transmit information on the risk avoidance control to the traveling plan drafting unit from the risk avoidance control unit. The traveling plan drafting unit can draft the traveling plan after the risk avoidance control is executed based on the information on the risk avoidance control.

In the vehicle control system having the above configuration, the risk avoidance control unit may be input notification of the execution of the risk avoidance control to the traveling plan drafting unit as the information on the risk avoidance control. According to this, it is possible to inform the fact that the risk avoidance control has been executed from the risk avoidance control unit to the traveling plan drafting unit.

In the vehicle control system having the above configuration, one or more ECUs may include a first ECU and a second ECU. The first ECU may operate as the traveling plan drafting unit, and the second ECU may operate as the automatic traveling control unit and the risk avoidance control unit. Further, for example, the second ECU may be an ECU fixed to the vehicle, and the first ECU may be an ECU detachable from the vehicle. Thereby, it is possible to standardize the ECU which controls vehicle travel among vehicles and to independently prepare the ECU drafting the traveling plan by the provider of services using automatic operation vehicles.

According to any one of the examples in the present disclosure, it is possible to provide useful information on the risk avoidance control to a drafting part of the traveling plan in a situation where the risk avoidance control is executed. On the basis of the provided useful information, the drafting part of the traveling plan can draft the traveling plan after the risk avoidance control is executed. Thus, the risk avoidance control and the automatic traveling control will coordinate well.

DESCRIPTION OF EMBODIMENTS

Figure 1:
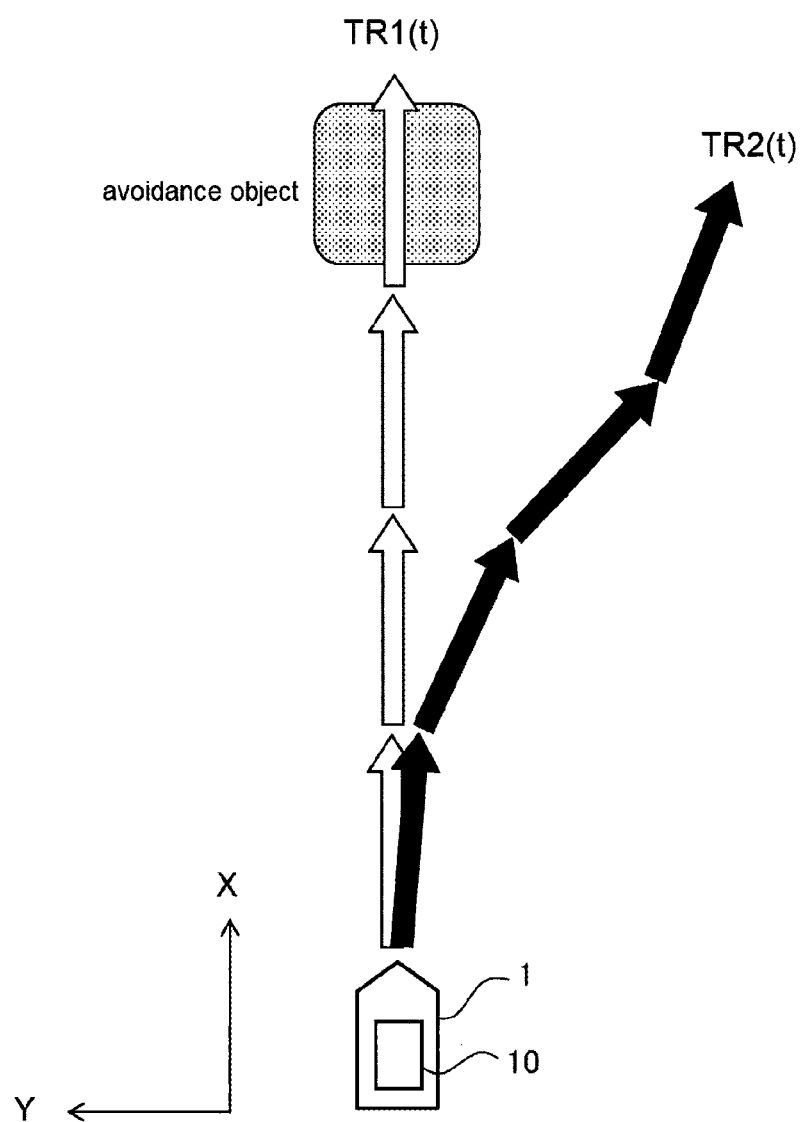
FIG. 1 is a diagram illustrating a first example of a risk avoidance control executed during a an automatic traveling control in a vehicle control system according to a first embodiment in the present disclosure.

Embodiments in the present disclosure will be described with reference to drawings. However, even if the numbers (such as the number, the quantity, and the range) of the each elements are referred in the following embodiments, the embodiments in the present disclosure are not limited to the number, unless specifically stated or obviously identified in principle. In addition, the structure, steps, or the like described in the following embodiments is not essential to the embodiments in the present disclosure unless specifically stated or clearly identified in principle.

1. First Embodiment 1-1. Automatic Traveling Control and Risk Avoidance Control

A vehicle control system according to the present embodiment is configured to perform an automatic traveling control for automatically traveling a vehicle and a risk avoidance control for avoiding a risk which possibly affects the vehicle. In the automatic traveling control according to the present embodiment, for example, an automatic operation level equal to or higher than level 3 is realized in the level definition of SAE (Society of Automotive Engineers).

The automatic traveling control is carried out based on a traveling plan of the vehicle. The traveling plan is designed to safely drive the vehicle along an optimal route to the destination while following traffic rules. The traveling plan includes actions such as maintaining a current driving lane, and changing lane. In the automatic traveling control, a target trajectory is generated based on the traveling plan. The target trajectory is a running locus which the vehicle should take eventually, and is determined after considering avoidance of collision with all obstacles in front of the vehicle. The target trajectory includes a set of target position of the vehicle in a road where the vehicle travels and a target speed for each target position. This set of the target position is also referred to as a target track. In the automatic traveling control, in order to cause the vehicle to follow the target trajectory, deviations between the vehicle and the target trajectory are calculated and steering, braking, or driving of the vehicle are controlled so that the deviation is reduced is performed. Herein, the deviations include lateral deviation, yaw angle deviation, speed deviation, etc.

The risk avoidance control is a control over the steering or braking of the vehicle, or both, which is performed so as to avoid a risk which possibly affects the vehicle. In some cases, control over the driving is also included in the risk avoidance control. Herein, "a risk which possibly affects the vehicle" means a risk of the kind which can be detected by a sensor and avoided by the control of the vehicle. A typical example is collision with an object including an obstacle. If the risk which possibly affects the vehicle is predicted during the execution of the automatic traveling control, the risk avoidance control intervenes in the automatic traveling control.

Hereinafter, some examples of the risk avoidance control performed during the automatic traveling control in the vehicle control system 10 according to the present embodiment will be described referring to FIGS. 1 to 3. The vehicle control system 10 is mounted on the vehicle 1 capable of automatic operation. However, at least a part of the vehicle control system 10 may be disposed in an external device outside the vehicle 1, and may remotely control the vehicle 1. That is, the vehicle control system 10 may be dividedly arranged in the vehicle 1 and the external device.

Figure 2:
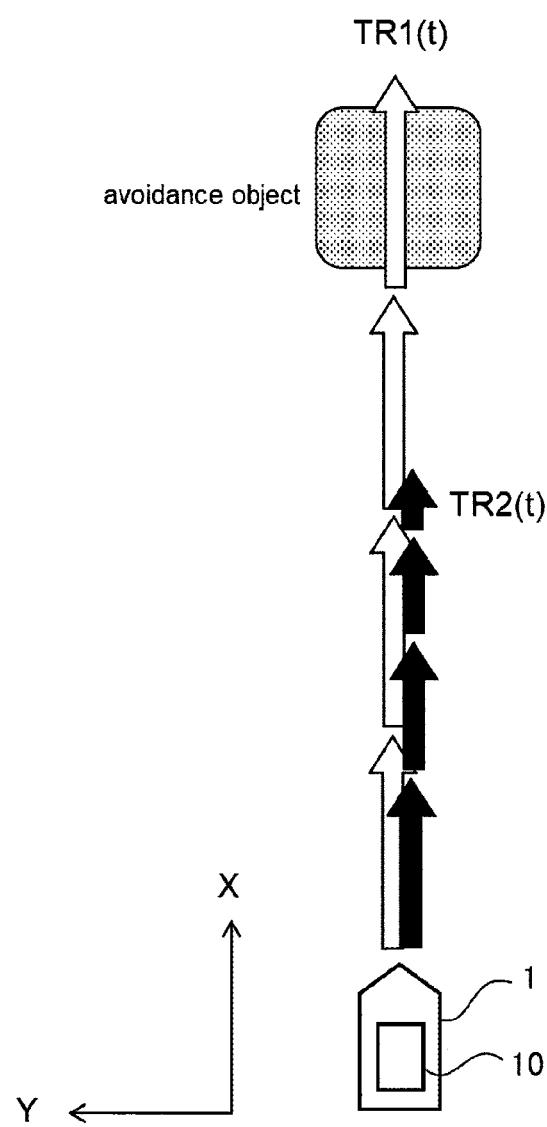
FIG. 2 is a diagram illustrating a second example of a risk avoidance control executed during an automatic traveling control in the vehicle control system according to the first embodiment in the present disclosure.
Figure 3:
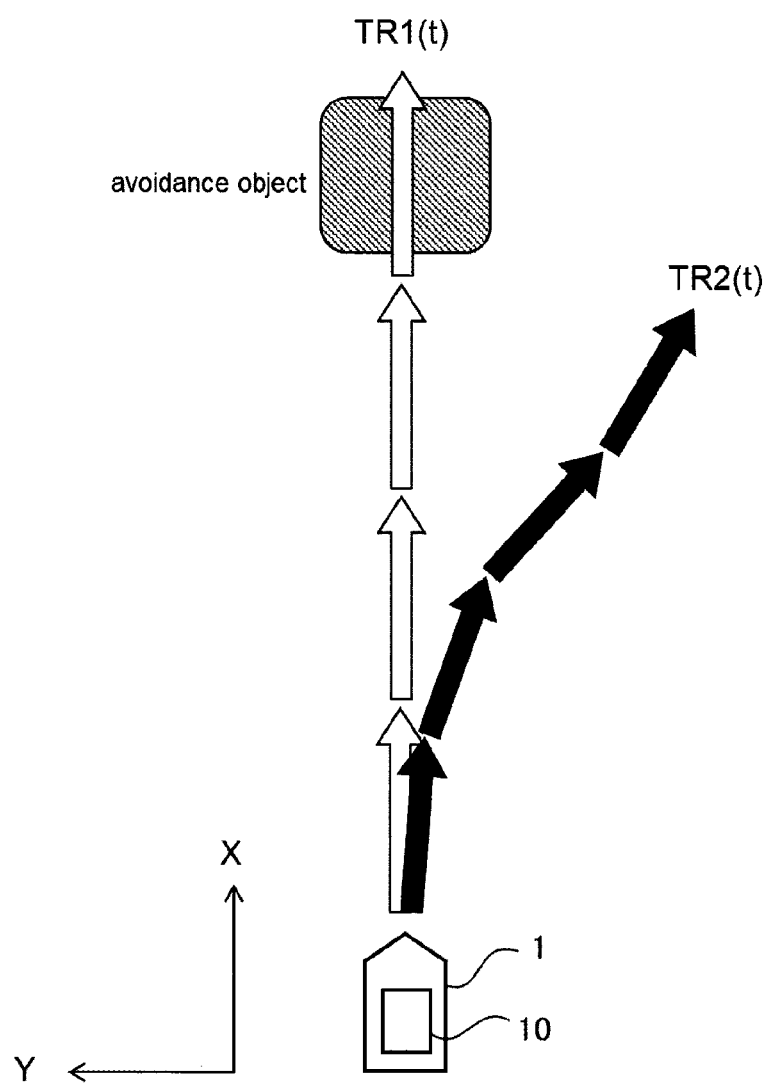
FIG. 3 is a diagram illustrating a third example of a risk avoidance control executed during an automatic traveling control in the vehicle control system according to the first embodiment in the present disclosure.

In the each example illustrated in FIGS. 1 to 3, a target trajectory TR1 based on the traveling plan is represented by successive white arrows. The target trajectory TR1 based on the traveling plan is hereinafter referred to as a "first target trajectory TR1". Each of the white arrows representing the first target trajectory TR1 indicates the displacement vector per unit time. The tip position of the each white arrow is the target position at each time, the length of the each white arrow indicates the target speed at each time. In the examples illustrated in FIGS. 1 to 3, the first target trajectory TR1 is generated so as to run the vehicle 1 straight at a constant speed.

In the risk avoidance control, a target trajectory TR2 for risk avoidance, which differs from the first target trajectory TR1 based on the traveling plan, is generated. The target trajectory TR2 for risk avoidance is hereinafter referred to as a "second target trajectory TR2". Each of black arrows representing the second target trajectory TR2 indicates the displacement vector per unit time. The tip position of the each black arrow is the target position at each time, and the length of the each black arrow indicates the target speed in the risk avoidance control. In the risk avoidance control, the steering or braking of the vehicle is controlled so as to cause the vehicle to follow the second target trajectory TR2.

Each example illustrated in FIGS. 1 to 3 illustrates a case where a pedestrian (that is, an avoidance object) jumping out suddenly appears on the first target trajectory TR1 from the left. In the example illustrated in FIG. 1, the second target trajectory TR2 for drawing a traveling locus to avoid the vehicle 1 to the right of the avoidance object is generated. That is, in this example, intervention is performed in the target locus among the target trajectory. In the example illustrated in FIG. 2, the second target trajectory TR2 for stopping in front of the avoidance object by strongly decelerating the vehicle 1 is generated. That is, in this example, intervention is performed in the target speed among the target trajectory. In the example illustrated in FIG. 3, the second target trajectory TR2 for decelerating the vehicle 1 to suppress lateral acceleration while avoiding the vehicle 1 to the right of the avoidance target is generated. That is, in this example, intervention is performed in the target locus and the target speed in the target trajectory.

When the risk avoidance control intervenes in the automatic traveling control, as apparent from the comparative between the first target trajectory TR1 and the second target trajectory TR2, the operation of the vehicle 1 is different from the operation required for realizing the traveling plan. The risk avoidance control and the automatic traveling control need to be well coordinated. The vehicle control system 10 according to the present embodiment is provided with a configuration for coordinating the risk avoidance control and the automatic traveling control. Hereinafter, the configuration of the vehicle control system 10 according to the present embodiment will be described.

1-2. Configuration and Function of Vehicle Control System

Figure 4:
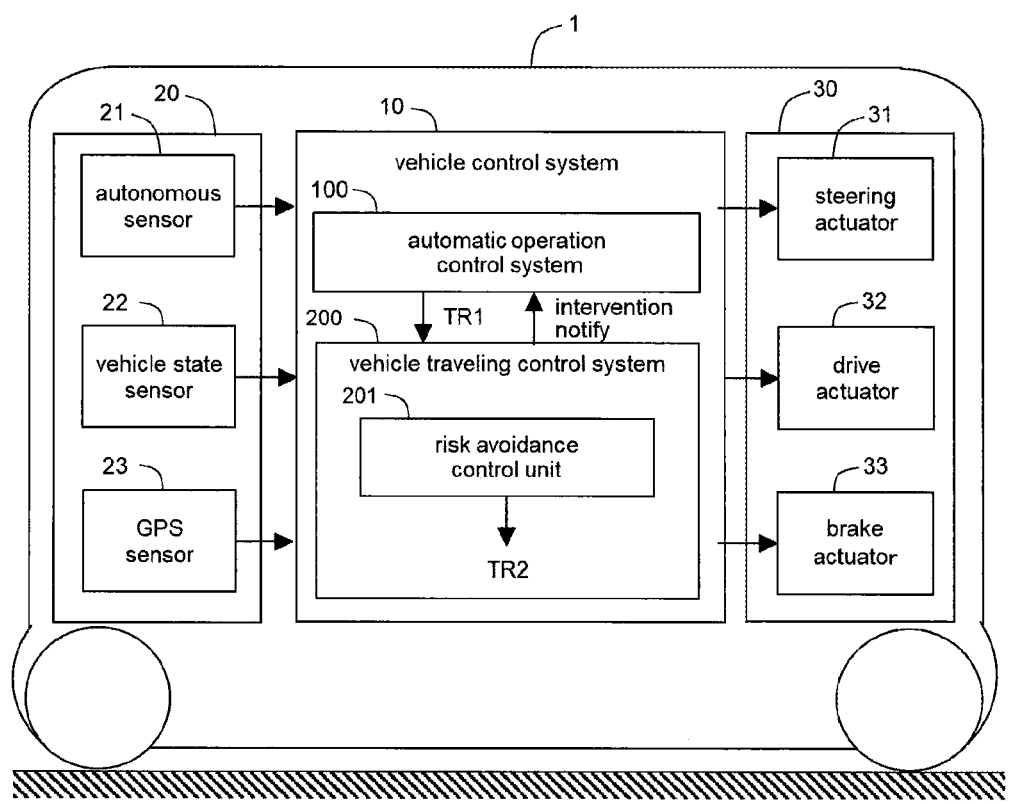
FIG. 4 is a diagram illustrating a configuration example of the vehicle control system according to the first embodiment in the present disclosure and a vehicle to which the vehicle control system is applied.

FIG. 4 is a diagram illustrating a configuration example of the vehicle to which the vehicle control system 10 according to the present embodiment is applied. The vehicle 1 includes the vehicle control system 10, in-vehicle sensors 20 for inputting information to the vehicle control system 10, and vehicle actuators 30 operated by a signal output from the vehicle control system 10.

The in-vehicle sensors 20 include an autonomous sensor 21, a vehicle state sensor 22, and a GPS sensor 23. The autonomous sensor 21 is a sensor for acquiring information about the peripheral environment of the vehicle 1. The autonomous sensor 21 includes, for example, a LiDAR, a camera, or a millimeter-wave radar. Based on the information acquired by the autonomous sensor 21, processing such as detection of an object existing in the vicinity of the vehicle 1, measurement of a relative position and a relative speed of the detected object to the vehicle 1, and recognition of the shape of the detected object, is performed. The vehicle state sensor 22 is a sensor for acquiring information on the motion of the vehicle 1, and includes, for example, a wheel speed sensor, an acceleration sensor, a yaw rate sensor, a steering angle sensor, or the like. The GPS sensor 23 is used to acquire information on the current position of the vehicle 1.

The vehicle actuators 30 includes a steering actuator 31 for steering the vehicle 1, a drive actuator 32 for driving the vehicle 1, and a brake actuator 33 for braking the vehicle 1. The steering actuator 31 includes, for example, a power steering system, a steer-by-wire steering system, a rear wheel steering system, or the like. The drive actuator 32 includes, for example, an engine, an EV (electric vehicle) system, or a hybrid system. The brake actuator 33 includes, for example, a hydraulic brake or a power regenerative brake.

The vehicle control system 10 includes an automatic operation control system 100 and a vehicle traveling control system 200. The automatic operation control system 100 and the vehicle traveling control system 200 are each independent ECUs (Electronic Control Unit) and comprise at least a processor and a storage device. The storage device includes a main storage device and an auxiliary storage device. Between the automatic operation control system 100 and the vehicle traveling control system 200, necessary information is input and output via wired or wireless communication such as CAN communication and communication of the Ethernet (registered trademark) standard. The vehicle traveling control system 200 may be a fixed ECU to the vehicle 1 while the automatic operation control system 100 may be a detachable ECU to the vehicle 1.

The automatic operation control system 100 is responsible for the management of the automatic operation of the vehicle 1 among the functions of the vehicle control system 10. The storage device included in the automatic operation control system 100 stores an automatic operation control program executable by the processor and various data related the automatic operation control program. The data includes map information. The map information may be stored in advance in the storage device, may be downloaded from an external server via the Internet, or may be referred to map information on an external server. When the processor executes the automatic operation control program, the processor acquires the sensor information from the in-vehicle sensor 20, recognizes a position of the vehicle 1 on the map, and recognizes situation around the vehicle 1. The processor drafts, based on the position of the vehicle 1 on the map and the peripheral situation of the vehicle 1, the traveling plan of the vehicle 1 during the automatic operation. Furthermore, the processor generates the first target trajectory TR1 based on the traveling plan, and outputs the first target trajectory TR1 to the vehicle traveling control system 200.

The vehicle traveling control system 200 is responsible for the automatic traveling control among the functions of the vehicle control system 10. The storage device included in the vehicle traveling control system 200 stores an automatic traveling control program executable by a processor and various data related the automatic traveling control program. When the processor executes the automatic traveling control program, the processor operates the vehicle actuator 30 so that the vehicle 1 follows the target trajectory to control steering, driving, and braking of the vehicle 1. During automatic operation of the vehicle 1, the vehicle traveling control system 200 receives the first target trajectory TR1 from the automatic operation control system 100. Basically, the vehicle traveling control system 200 performs the automatic traveling control so that the vehicle 1 follows the first target trajectory TR1.

The storage device included in the vehicle traveling control system 200 further stores a risk avoidance control program executable by the processor and various data related the risk avoidance control program. By executing the risk avoidance control program on the processor, the processor functions as a risk avoidance control unit 201. That is, the risk avoidance control unit 201 is not present as hardware but is implemented in software by executing a risk avoidance control program by the processor.

The risk avoidance control unit 201 predicts a risk which possibly affects to the vehicle 1 based on the information obtained from the in-vehicle sensors 20. As a specific example, the risk avoidance control unit 201 detects an obstacle in front of the vehicle 1 by the autonomous sensor 21 and predicts possibility of a collision with the obstacle based on information obtained from the autonomous sensor 21 and the vehicle state sensor 22. one operating condition of the risk avoidance control is that the risk is predicted, that is, the collision with the obstacle is predicted. When the operation condition of the risk avoidance control is satisfied, the risk avoidance control unit 201 intervenes in the automatic traveling control by generating the second target trajectory TR2 for risk avoidance.

If the operation condition of the risk avoidance control is satisfied during the automatic operation and the second target trajectory TR2 is generated, the vehicle traveling control system 200 uses the second target trajectory TR2 in preference to the first target trajectory TR1. That is, the vehicle traveling control system 200 operates the vehicle actuators 30 and controls the steering, driving, and braking of the vehicle 1 so as to cause the vehicle 1 to follow the second target trajectory TR2.

Furthermore, the vehicle traveling control system 200 has a function to transmit, when the risk avoidance control unit 201 intervenes in the automatic traveling control, an intervention notice to the automatic operation control system 100. The intervention notice is a notification of information on the risk avoidance control. One example of the intervention notice is a flag which informs the execution of the risk avoidance control. Another example of the intervention notice is information indicating the execution and an intervention method of the risk avoidance control. The information of the intervention method of the risk avoidance control indicates whether the intervention of the risk avoidance control in the automatic traveling control is an intervention in the target track, an intervention in the target speed, or an intervention in both the target track and the target speed.

The automatic operation control system 100 receives the intervention notice from the vehicle traveling control system 200. When the actual trajectory of the vehicle 1 substantially deviated from the first target trajectory TR1, the automatic operation control system 100 usually determined that an abnormality occurs in a control system or a structural system of the vehicle 1, and executes a predetermined abnormality process. The abnormality process includes, for example, informing the occupant of the abnormality via the HMI or switching to manual operation by stopping the automatic operation. However, when receiving the intervention notice, the automatic operation control system 100 does not execute the abnormality process even if the vehicle 1 is not traveling along the first target trajectory TR1.

When the intervention notice is a flag indicating the execution of the risk avoidance control, the automatic operation control system 100 continues the calculation of the first target trajectory TR1 as usual. That is, the automatic operation control system 100 drafts the traveling plan of the vehicle 1 based on the current position of the vehicle 1 on the map and the peripheral situation of the vehicle 1, and generates the first target trajectory TR1 based on the traveling plan. By continuing the calculation of the first target trajectory TR1 even while the risk avoidance control is executed, continuity of the target trajectory after the risk avoidance control is released is ensured.

When the intervention notice indicates the execution of the risk avoidance control and the intervention method, the automatic operation control system 100 continues the calculation of the first target trajectory TR1 as usual. If the intervention method of the risk avoidance control is the intervention in the target track, the automatic operation control system 100 continues to output the target speed to the vehicle traveling control system 200. If the intervention method of the risk avoidance control is the intervention in the target speed, the automatic operation control system 100 continues to output the target track to the vehicle traveling control system 200. By continuing the calculation of the first target trajectory TR1 even while the risk avoidance control is executed and continuing to output the target values which have not been intervened, continuity of the target trajectory after the risk avoidance control is released is ensured.

When the risk avoidance control intervenes in the automatic traveling control, the automatic operation control system 100 changes, depending on the status of the intervention, a parameter of the determination criteria for the creation of the first target trajectory TR1. For example, when there is an intervention of the risk avoidance control though the first target trajectory TR1 for decelerating the vehicle 1 with respect to the preceding vehicle is created, the automatic operation control system 100 changes the threshold for determining the deceleration so as to advance the deceleration determination. Further, when the risk avoidance control which is not avoided by the steering is performed though the first target trajectory TR1 for avoiding the obstacle by the steering is created, the automatic operation control system 100 changes the parameter of the determination criterion so as to be difficult to avoid by the steering. If the frequency of the intervention of the risk avoidance control is high, the automatic operation control system 100 reduces the frequency of the intervention of the risk avoidance control by lowering the maximum speed of the first target trajectory TR1.

The structure and function of the vehicle control system 10 described above are related to the claims as follows. The automatic operation control system 100 corresponds to the "traveling plan drafting unit", the vehicle traveling control system 200 corresponds to the "automatic traveling control unit", the risk avoidance control unit 201 corresponds to the "risk avoidance control unit".

1-3. Specific Example of Processing by Vehicle Control System

Figure 5:
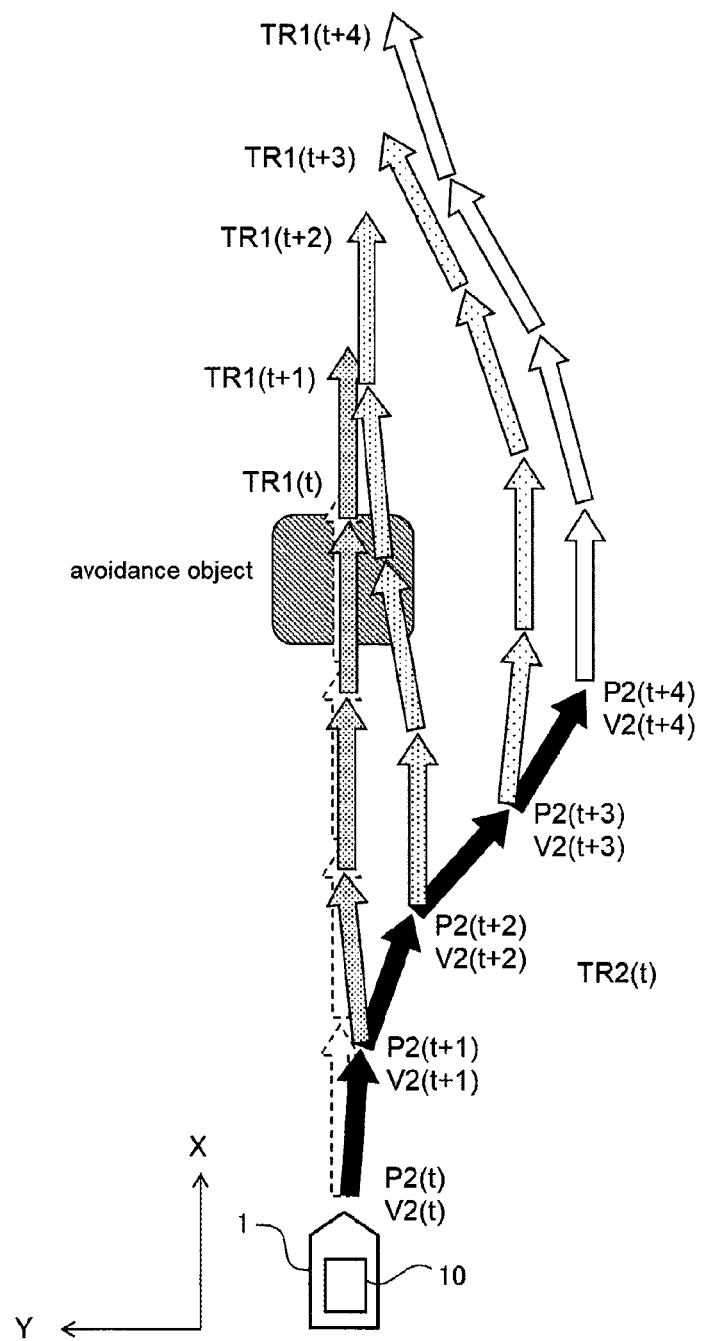
FIG. 5 is a diagram for explaining a specific example of processing by the vehicle control system according to the first embodiment in the present disclosure.

FIG. 5 is a diagram for explaining a specific example of processing by the vehicle control system 10 according to the present embodiment. In FIG. 5, the first target trajectory TR1(t) at current time "t" is indicated by a broken line arrow. The current time "t" is the time corresponding to the current position of the vehicle 1. Since the first target trajectory TR1(t) interferes with the avoidance object, the risk avoidance control unit 201 executes the risk avoidance control, and the second target trajectory TR2(t) is created. Upon the execution of the risk avoidance control, the intervention notice is transmitted from the vehicle traveling control system 200 to the automatic operation control system 100.

When receiving the intervention notice from the vehicle traveling control system 200, the automatic operation control system 100 calculates the first target trajectory TR1 considering after recovery from the risk avoidance control. Specifically, the automatic operation control system 100 usually creates the first target trajectory TR1 based on the traveling plan. However, during the intervention of the risk avoidance control, the first target trajectory TR1 is not adopted in the vehicle traveling control system 200, but the second target trajectory TR2 created by the risk avoidance control unit 201 is adopted instead. During the intervention of the risk avoidance control, the automatic operation control system 100 continues to create the first target trajectory TR1 starting from the current status of the vehicle 1 so as to smoothly return to the first target trajectory TR1 after the end of the risk avoidance control. Hereinafter, this will be described in detail.

If the risk avoidance control is started at the time "t", the vehicle 1 is controlled to follow the second target trajectory TR2(t). Then, at a time "t+1" which is one step later than the time "t", the vehicle 1 is located at a position P2(t+1) in the second target trajectory TR2(t) and has speed V2(t+1). P2 is the position vector in the XY coordinate system and V2 is the speed vector. In the example illustrated in FIG. 5, the X direction is the forward direction of the vehicle 1, the Y direction is a direction of plane perpendicular to the X direction.

The automatic operation control system 100 creates the first target trajectory TR1(t+1) at time "t+1" based on the vehicle state including the position P2(t+1) and the speed V2(t+1) of the vehicle 1 at time "t+1". Similarly, the automatic operation control system 100 creates the first target trajectory TR1(t+i) at time "t+i" based on the vehicle state including the position P2(t+i) and the velocity V2(t+i) of the vehicle 1 at time "t+i". Herein, "i" is an integer equal to or greater than 2.

In the example illustrated in FIG. 5, the risk avoidance control is released at time "t+4". After the time "t+4", the traveling operation of the vehicle 1 is controlled so as to follow the first target trajectory TR1(t+4). The automatic operation control system 100 creates the first target trajectory TR1(t+4) so that the first target trajectory TR1(t+4) smoothly continue with the second target trajectory TR2(t) based on the vehicle state including the position P2(t+4) and the speed V2(t+4) of the vehicle 1 at the time "t+4" As a result, disturbance in the behavior of the vehicle 1 after the risk avoidance control is released is suppressed.

1-4. Flow of Processing by Vehicle Control System

Figure 6:
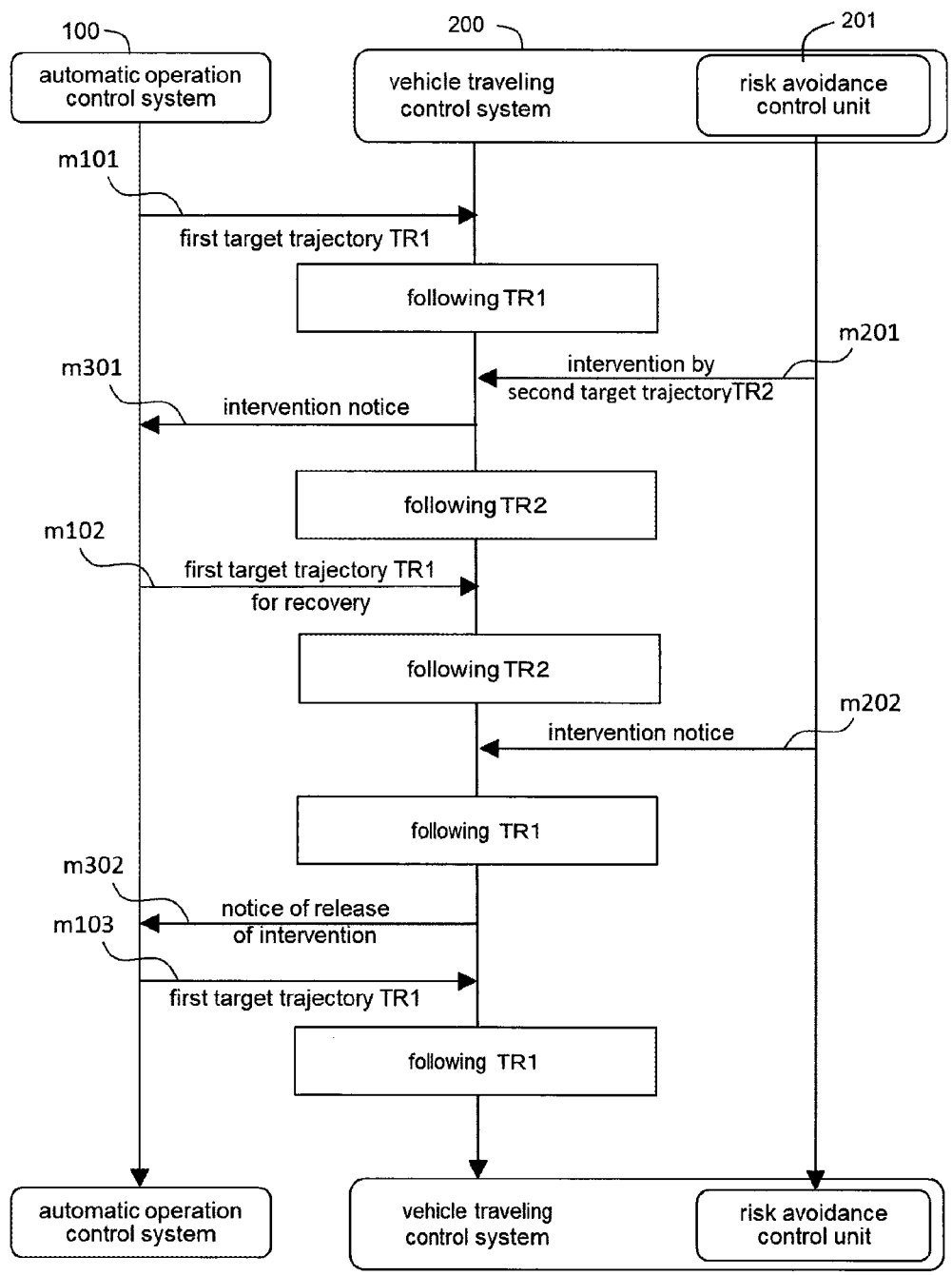
FIG. 6 is a sequence diagram illustrating a process by the vehicle control system according to the first embodiment in the present disclosure.

The above described processing by the vehicle control system 10 according to the present embodiment is represented by a sequence diagram as illustrated in FIG. 6. This sequence diagram represents a sequence for returning from the intervention of the risk avoidance control to the automatic traveling control based on the traveling plan with a minimum of flags.

First, in a message m101 from the automatic operation control system 100 to the vehicle traveling control system 200, the first target trajectory TR1 is transmitted. The vehicle traveling control system 200 controls the traveling operation of the vehicle 1 so that the vehicle 1 follows the first target trajectory TR1.

When the risk avoidance control intervenes in the automatic traveling control, the risk avoidance control unit 201 transmits a message m201 to the vehicle traveling control system 200. In the message m201, the second target trajectory TR2 which intervenes in the automatic traveling control is transmitted.

In response to the message m201 from the risk avoidance control unit 201, the vehicle traveling control system 200 transmits a message m301 to the automatic operation control system 100. In the message m301, an intervention notice informing the intervention of the risk avoidance control is transmitted. In addition, in response to the message m201 from the risk avoidance control unit 201, the vehicle traveling control system 200 switches the following subject of the vehicle 1 from the first target tracking TR1 to the second target trajectory TR2.

The automatic operation control system 100 transmits a message m102 to the vehicle traveling control system 200 after receiving the intervention notice. In the message m102, the first target trajectory TR1 is transmitted in preparation for recovery from the risk avoidance control. However, the vehicle traveling control system 200 continues the traveling control for causing the vehicle to follow the second target trajectory TR2.

If the intervention of the risk avoidance control is released, the risk avoidance control unit 201 transmits a message m202 to the vehicle traveling control system 200. In the message m202, it is notified that the intervention of the risk avoidance control in the automatic traveling control is released. Upon receiving the message m202 from the risk avoidance control unit 201, the vehicle traveling control system 200 returns the following subject of the vehicle 1 to the first target trajectory TR1.

With returning the following subject of the vehicle 1 to the first target trajectory TR1, the vehicle traveling control system 200 transmits a message m302 to the automatic operation control system 100. In the message m302, a notice of the release of the intervention is transmitted, which indicates that the intervention of the risk avoidance control has been released.

The automatic operation control system 100, after receiving the notice of the release of the intervention, transmits the normal first target trajectory TR1 to the vehicle traveling control system 200 in a message m103. The vehicle traveling control system 200 continues the traveling control for causing the vehicle to follow the first target trajectory TR1.

1-5. Other Configuration Example of Vehicle Control System

Figure 7:
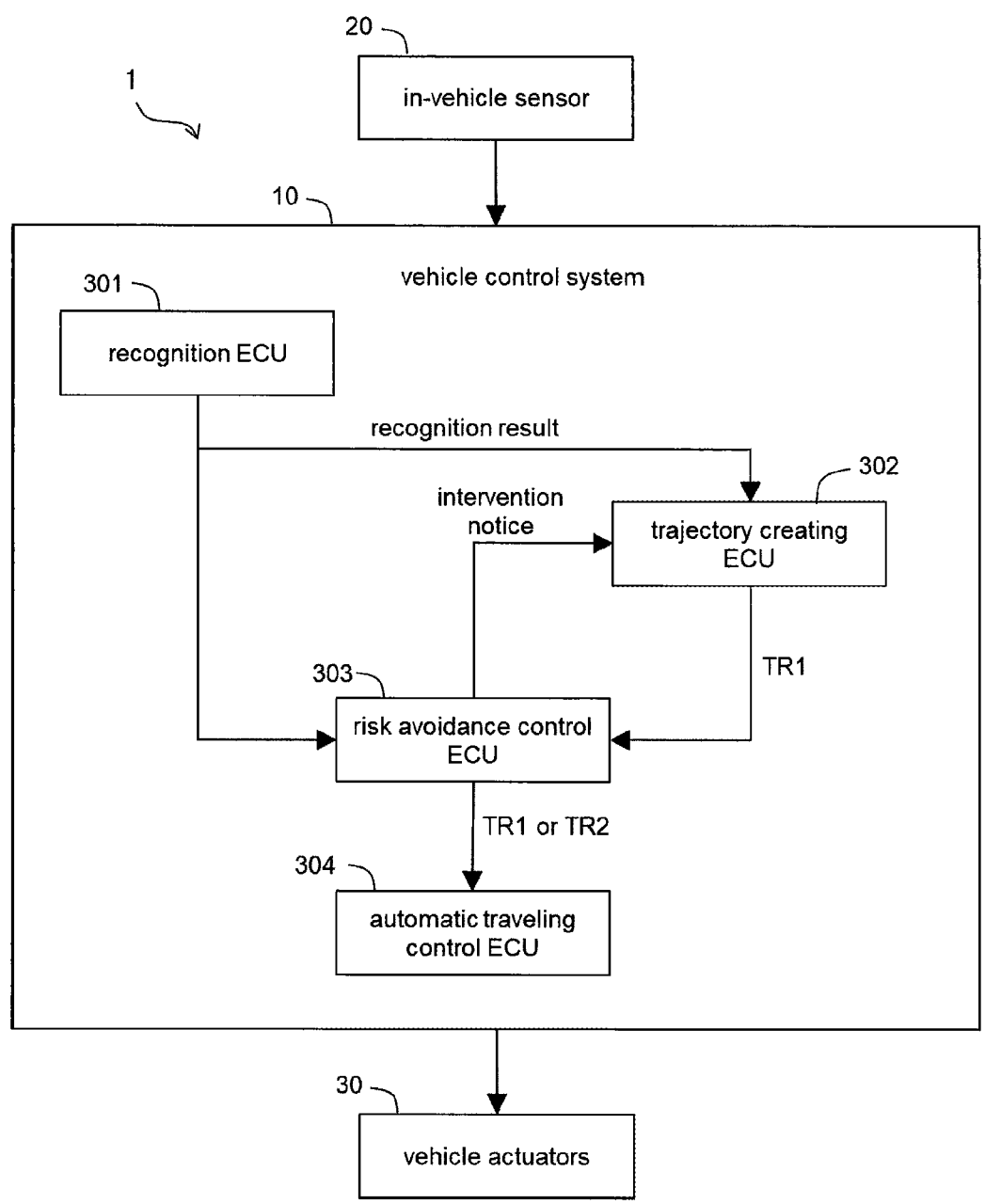
FIG. 7 is a diagram illustrating a first other configuration example of the vehicle control system according to the first embodiment in the present disclosure.

Next, other configuration example of the vehicle control system according to the present embodiment will be described. FIG. 7 is a diagram illustrating a first other configuration example of the vehicle control system according to the present embodiment. In this configuration, the vehicle control system 10 includes four ECUs, i.e., a recognition ECU301, a trajectory creating ECU302, a risk avoidance control ECU303, and an automatic traveling control ECU304.

The recognition ECU301 acquires sensor information from the in-vehicle sensors 20, and recognizes the position of the vehicle 1 on the map and the peripheral situation of the vehicle 1. The recognition result by the recognition ECU301 is inputted to the trajectory creating ECU302 and the risk avoidance control ECU303. However, the types of the input recognition results are not necessarily the same between the trajectory creating ECU302 and the risk avoidance control ECU303.

The trajectory creating ECU302 drafts a traveling plan based on the recognition result input from the recognition ECU301, and creates the first target trajectory TR1 based on the traveling plan. The trajectory creating ECU302 inputs the first target trajectory TR1 to the risk avoidance control ECU303.

The risk avoidance control ECU303 predicts the risk which possibly affects the vehicle 1 based on the recognition result inputted from the recognition ECU301. A typical example of the risk which possibly affects the vehicle 1 is a risk of collision with an obstacle. When the risk is not predicted, the risk avoidance control ECU303 inputs the first target trajectory TR1 inputted from the trajectory creating ECU302 to the automatic traveling control ECU304 as it is. On the other hand, when the risk is predicted, for example, when a collision with an obstacle is predicted, the risk avoidance control ECU303 creates the second target trajectory TR2 for avoiding the risk. Then, the risk avoidance control ECU303 intervenes in the automated travel control by the automatic traveling control ECU304, and inputs the second target trajectory TR2 to the automatic traveling control ECU304. In addition, the risk avoidance control ECU303 inputs the intervention notice for notifying the intervention of the risk avoidance control to the trajectory generation ECU302.

The automatic traveling control ECU304 basically determines the respective operation amount of the vehicle actuators 30 to cause the vehicle 1 to follow the first target trajectory TR1, and controls the steering, driving or braking of the vehicle 1 based on the respective operation amount. However, when the risk avoidance control ECU303 intervenes, that is, if the second target trajectory TR2 is input instead of the first target trajectory TR1, the automatic traveling control ECU304 determines the respective operation amount of the vehicle actuators 30 so as to cause the vehicle 1 to follow the second target trajectory TR2, and controls the steering or braking of the vehicle 1.

The correspondence relationship between the configuration example illustrated in FIG. 7 and the configuration example illustrated in FIG. 4 is as follows. The functions of the automatic operation control system 100 illustrated in FIG. 4 are divided into the recognition ECU301 and the trajectory creating ECU302 in FIG. 7. The functions of the vehicle traveling control system 200 illustrated in FIG. 4 are divided into the recognition ECU301, the risk avoidance control ECU303, and the automatic traveling control ECU304 in FIG. 7. As for the relation with the claims, the recognition ECU301 and the trajectory creating ECU302 correspond to a "traveling plan drafting unit", the automatic traveling control ECU304 corresponds to an "automatic traveling control unit", and the recognition ECU301 and the risk avoidance control ECU303 correspond to a "risk avoidance control unit".

Figure 8:
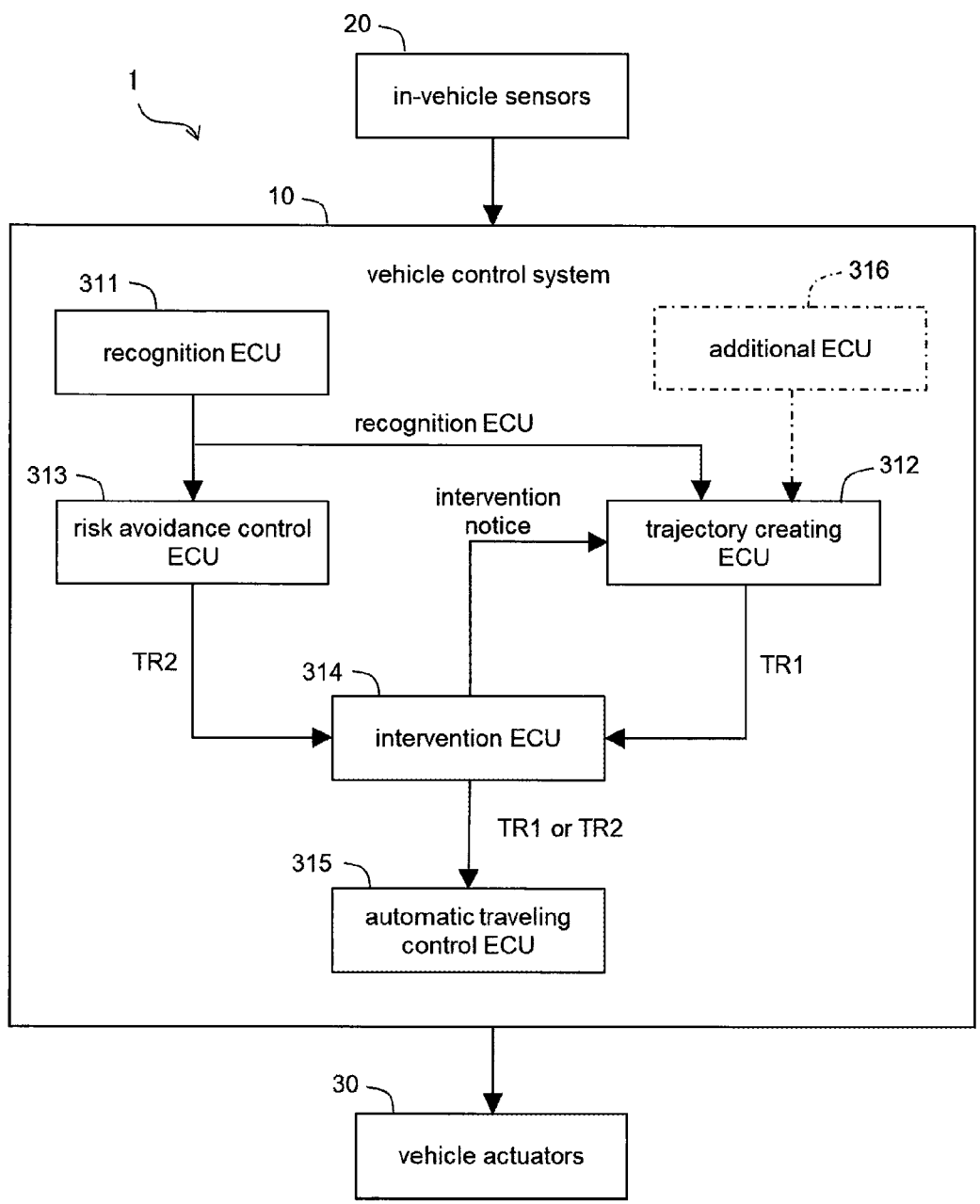
FIG. 8 is a diagram illustrating a second other configuration example of the vehicle control system according to the first embodiment in the present disclosure.

FIG. 8 is a diagram illustrating a second other configuration example of a vehicle control system according to the present embodiment. In this configuration, the vehicle control system 10 includes five ECUs, namely, a recognition ECU311, a trajectory creating ECU312, a risk avoidance control ECU313, an intervention ECU314, and an automatic traveling control ECU315. Further, it is also possible to add an additional ECU316 illustrated by a one-dot chain line in FIG. 8 to the vehicle control system 10.

The recognition ECU311 acquires sensor information from the in-vehicle sensors 20, and recognizes the position of the vehicle 1 on the map and the peripheral situation of the vehicle 1. The recognition result by the recognition ECU311 are inputted to the trajectory creating ECU312 and the risk avoidance control ECU313. If the additional ECU316 is provided, the recognition result is also inputted to the additional ECU316. However, the types of inputted recognition results are not necessarily the same among the trajectory creating ECU312, the risk avoidance control ECU313, and the additional ECU316.

The trajectory creating ECU312 drafts a traveling plan based on the recognition result input from the recognition ECU311, and creates a first target trajectory TR1 based on the travel plan. However, when the additional ECU316 is provided, the additional ECU316 drafts the traveling plan based on the recognized result, and the trajectory creating ECU312 creates the first target trajectory TR1 based on the traveling plan. The trajectory creating ECU312 inputs the first target trajectory TR1 to the intervention ECU314.

Based on the recognition result inputted from the recognition ECU311, the risk avoidance control ECU313 predicts a risk which possibly affects to the vehicle 1, such as a collision with an obstacle. Then, when the risk is predicted, the risk avoidance control ECU313 creates a second target trajectory TR2 for avoiding the risk. Then, the risk avoidance control ECU313 inputs the second target trajectory TR2 to the intervention ECU314.

When only the first target trajectory TR1 is input, the intervention ECU314 inputs the first target trajectory TR1 to the automatic traveling control ECU315. When the second target trajectory TR2 is also input together with the first target trajectory TR1, the intervention ECU314 inputs the second target trajectory TR2 to the automatic traveling control ECU315, and causes the risk avoidance control to intervene in the automatic traveling control. In this instance, the intervention ECU314 inputs an intervention notice notifying the intervention of the risk avoidance control to the trajectory creating ECU312.

The automatic traveling control ECU315 basically determines the respective operation amount of the vehicle actuators 30 so as to cause the vehicle to follow the first target trajectory TR1, and controls the steering, driving or braking of the vehicle 1. However, when the second target trajectory TR2 is input instead of the first target trajectory TR1, the automatic traveling control ECU315 determines the respective operation amount of the vehicle actuators 30 so as to cause the vehicle 1 to follow the second target trajectory TR2, and controls the steering or braking of the vehicle 1.

The correspondence relationship between the configuration example illustrated in FIG. 8 and the configuration example illustrated in FIG. 4 is as follows. The functions of the automatic operation control system 100 illustrated in FIG. 4 are divided into the recognition ECU311 and the trajectory creating ECU312 in FIG. 8, or are divided into the recognition ECU311, the trajectory creating ECU312 and the additional ECU316. The functions of the vehicle traveling control system 200 illustrated in FIG. 4 are divided into the recognition ECU311, the risk avoidance control ECU313, the intervention ECU314, and the automatic traveling control ECU315 in FIG. 8. As for the relation to the claims, the recognition ECU311 and the trajectory creating ECU312 correspond to a "traveling plan drafting unit".

Alternatively, the recognition ECU311, the trajectory creating ECU312, and the additional ECU316 correspond to a "traveling plan drafting unit". The automatic traveling control ECU315 corresponds to an "automatic traveling control unit", and the recognition ECU311, the risk avoidance control ECU313, and the intervention ECU314 correspond to a "risk avoidance control unit".

In addition to the configuration examples illustrated in FIGS. 4, 7 and 8, the vehicle control system 10 according to the present embodiment may take various configurations. For example, the vehicle control system 10 may be configured with one ECU, and the traveling plan drafting unit, the automatic traveling control unit, and the risk avoidance control unit may be realized by executing a program by the ECU.

2. Second Embodiment

2-1. Intervention of Risk Avoidance Control in Automatic Traveling Control

Whereas the intervention in the automatic traveling control is performed when the risk to the vehicle is predicted in the first embodiment, the intervention in the operation amount of the vehicle actuators is performed in a vehicle control system according to the present embodiment.

Figure 9:
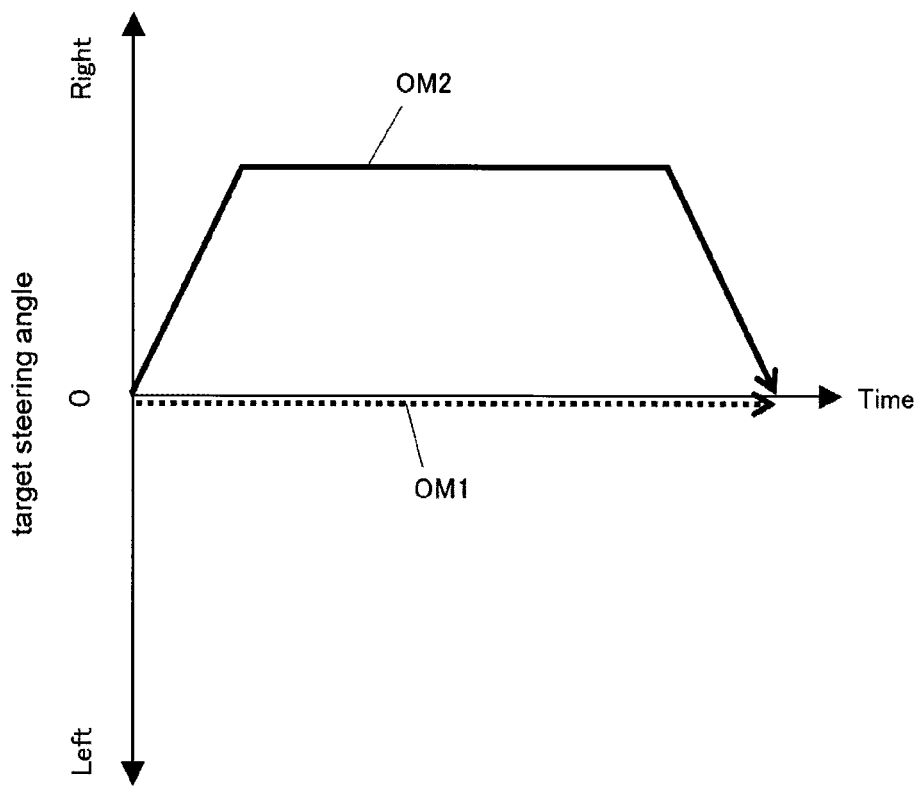
FIG. 9 is a diagram illustrating a first example of a risk avoidance control executed during an automatic traveling control in a vehicle control system according to a second embodiment in the present disclosure.
Figure 10:
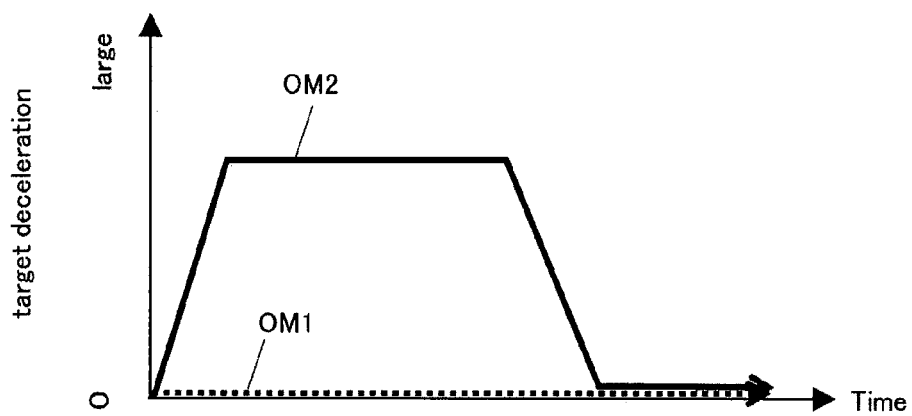
FIG. 10 is a diagram illustrating a second example of a risk avoidance control executed during an automatic traveling control in the vehicle control system according to the second embodiment in the present disclosure.

Referring to FIGS. 9 and 10, some examples of the risk avoidance control performed during the automatic traveling control in the vehicle control system according to the present embodiment. In the example illustrated in FIG. 9, the relationship between target steering angle and time is represented by a graph. Herein, the target steering angle is one of target operation amount of the vehicle. The target steering angle indicated by the broken line is the first target steering angle OM1 for realizing the target trajectory calculated based on the traveling plan. The target steering angle indicated by the solid line is the second target steering angle OM2 for avoiding the risk. FIG. 9 illustrates an example in which the risk avoidance control is activated because the pedestrian (avoidance object) suddenly jumps out from the left side. In this case, the risk avoidance control causes the vehicle to avoid the avoidance object to the right side of the avoidance object. By controlling the steering actuator in accordance with the second target steering angle OM2 instead of the first target steering angle OM1, the operation of the vehicle, such as the second target trajectory TR2 illustrated in FIG. 1, is realized, and the collision with the avoidance object is avoided.

In the example illustrated in FIG. 10, the relationship between target deceleration and time of the vehicle is represented by a graph. The target deceleration indicated by a broken line is a first target deceleration OM1 for realizing the target trajectory calculated on the basis of the traveling plan. The target deceleration illustrated by the solid line is the second target deceleration OM2 for avoiding the risk. FIG. 10 illustrates an example in which the risk avoidance control is activated because a pedestrian (avoidance object) suddenly jumps out appeared in front of the vehicle. In this case, the risk avoidance control causes the vehicle to stop in front of the avoidance object by decelerating the vehicle strongly. By controlling the brake actuator in accordance with the second target deceleration OM2 instead of the first target deceleration OM1, the operation of the vehicle, such as the second target trajectory TR2 illustrated in FIG. 2, is realized, the collision with the avoidance object is avoided.

Further, although not illustrated, the risk avoidance control may intervene in both the target steering angle and the target deceleration. In this case, it is also possible to realize the operation of the vehicle, such as the second target trajectory TR2 illustrated in FIG. 3.

2-2. Configuration and Function of Vehicle Control System

Figure 11:
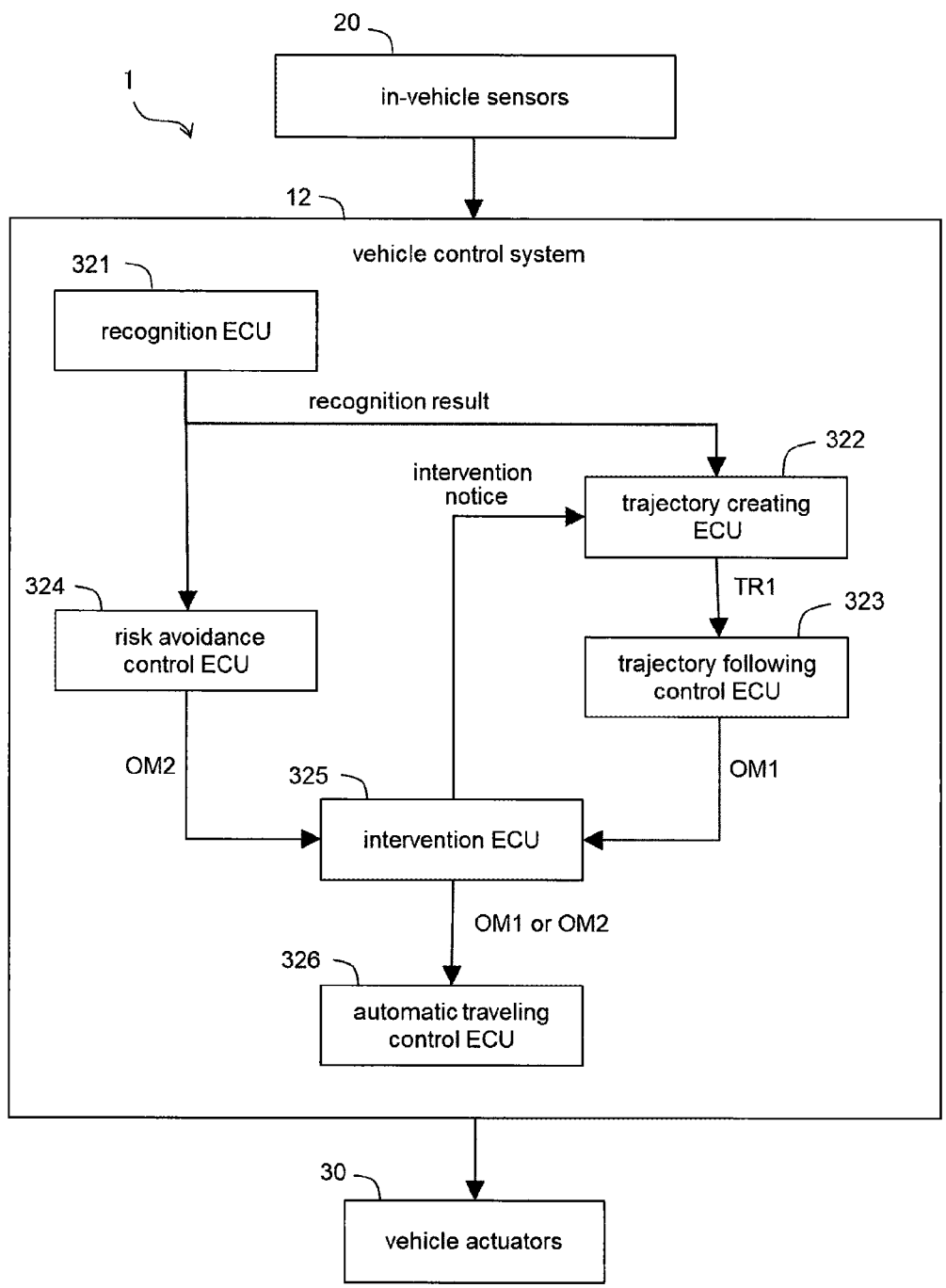
FIG. 11 is a diagram illustrating a configuration example of the vehicle control system according to the second embodiment in the present disclosure.

FIG. 11 is a diagram illustrating a configuration example of the vehicle control system 12 according to the present embodiment. In this example configuration, the vehicle control system 12 includes six ECUs, that is, a recognition ECU321, a trajectory creating ECU322, a trajectory following control ECU323, a risk avoidance control ECU324, an intervention ECU325, and an automatic traveling control ECU326.

The recognition ECU321 acquires sensor information from the in-vehicle sensors 20, and recognizes the position of the vehicle 1 on the map and the peripheral situation of the vehicle 1. The recognition result by the recognition ECU321 is inputted to the trajectory creating ECU322 and the risk avoidance control ECU324. However, the types of the input recognition results are not necessarily the same between the trajectory creating ECU322 and the risk avoidance control ECU324.

The trajectory creating ECU322 drafts a traveling plan based on the recognition result input from the recognition ECU321, and creates a first target trajectory TR1 based on the traveling plan. The trajectory creating ECU322 inputs the first target trajectory TR1 to the trajectory following control ECU323.

The trajectory following control ECU323 calculates the first target operation amount OM1 of the vehicle actuators 30 for causing the vehicle 1 to follow the first target trajectory TR1. The first target operation amount OM1 includes the target steering angle, target acceleration, and target deceleration. However, either the target acceleration or the target deceleration is calculated. The trajectory following control ECU323 inputs the first target operation amount OM1 to the intervention ECU325.

The risk avoidance control ECU324 predicts the risk which possibly affects to the vehicle 1, such as a collision with an obstacle, based on the recognition result input from the recognition ECU321. Then, when the risk is predicted, the risk avoidance control ECU324 creates a second target trajectory TR2 for avoiding the risk. Furthermore, the risk avoidance control ECU324 calculates the second target operation amount OM2 of the vehicle actuators 30 for causing the vehicle 1 to follow the second target trajectory TR2. The second target operation amount OM2 basically includes the target steering angle and the target deceleration. However, in some cases, the target accelerations are also included in the second target operation amount OM2. For example, in a lane change by the automatic traveling control, when the vehicle 1 gets too close a vehicle on the lane change destination, the target acceleration is created for escaping from traveling side-by-side while the correction of the target steering angle. The risk avoidance control ECU324 inputs the second target operation amount OM2 to the intervention ECU325.

When only the first target operation amount OM1 is inputted, the intervention ECU325 inputs the first target operation amount OM1 to the automatic traveling control ECU326. When the second target operation amount OM2 is also input together with the first target operation amount OM1, the intervention ECU325 inputs the second target operation amount OM2 to the automatic traveling control ECU326, and causes the risk avoidance control to intervene in the automatic traveling control. In this instance, the intervention ECU325 inputs an intervention notice notifying the intervention of the risk avoidance control to the trajectory creating ECU322.

The automatic traveling control ECU326 basically operates the vehicle actuators 30 in accordance with the first target operation amount OM1 so as to control steering, driving or braking of the vehicle 1. However, when the second target operation amount OM2 is input instead of the first target operation amount OM1, the automatic traveling control ECU326 operates the vehicle actuators 30 in accordance with the second target operation amount OM2 and controls the steering, drive or braking of the vehicle 1.

The structure and the function of the vehicle control system 12 described above are related to the claims as follows. The recognition ECU321, the trajectory creating ECU322, and the trajectory following control ECU323 correspond to a "traveling plan drafting unit". The automatic traveling control ECU326 corresponds to an "automatic traveling control unit", and the recognizing ECU321, the risk avoidance control ECU324, and the intervention ECU325 correspond to a "risk avoidance control unit".

In addition to the configuration example illustrated in FIG. 11, the vehicle control system 12 according to the present embodiment may take various configurations. For example, as in the configuration example of the vehicle control system 10 according to the first embodiment illustrated in FIG. 4, a vehicle control system 12 may be configured by the automatic operation control system 100 and the vehicle traveling control system 200. In this case, the first target operation amount OM1 may be transmitted from the automatic operation control system 100 to the vehicle traveling control system 200. And, the second target operation amount OM2 is created in the risk avoidance control unit 201. Also, the vehicle control system 12 may be constituted with one ECU, and the traveling plan drafting unit, the automatic traveling control unit, and the risk avoidance control unit may be realized by executing a program by the ECU.

2-3. Specific Example of Processing by Vehicle Control System

Figure 12:
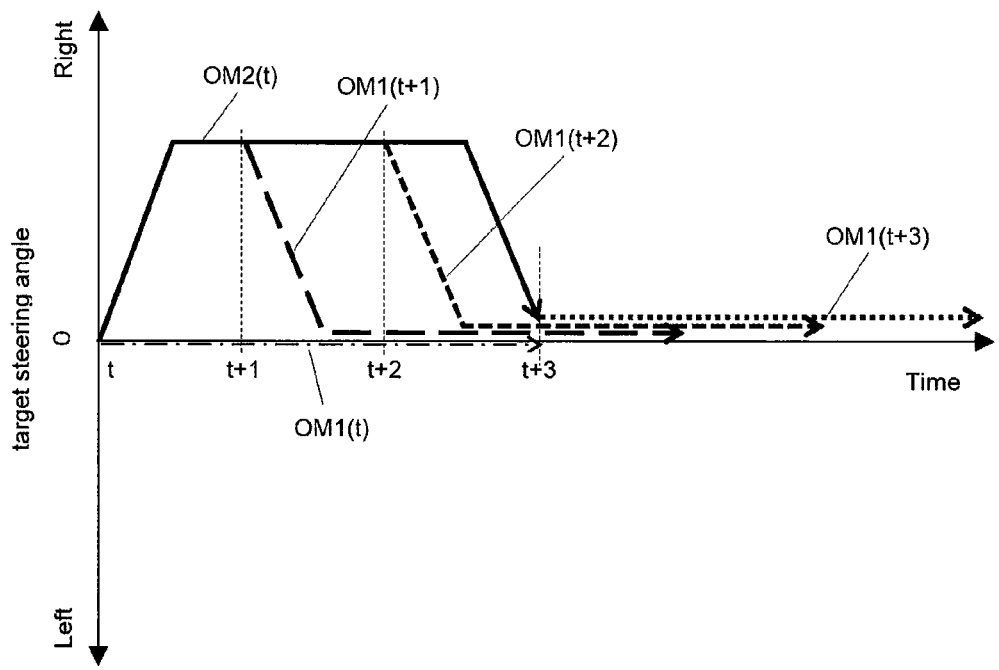
FIG. 12 is a diagram for explaining a specific example of processing by the vehicle control system according to the second embodiment in the present disclosure.

FIG. 12 is a diagram for explaining a specific example of processing by the vehicle control system 12 according to the present embodiment. In FIG. 12, the first target steering angle OM1($t$) at the current time "t" is indicated by a broken line. The current time "t" is the time corresponding to the current position of the vehicle 1. Since the steering by the first target steering angle OM1($t$) interferes with an avoidance object, the risk avoidance control by the risk avoidance control ECU324 is executed, and the second target steering angle OM2($t$) is created. The intervention notice is transmitted from the intervention ECU325 to the trajectory creating ECU322 in response to the execution of the risk avoidance control.

Upon receiving the intervention notice from the intervention ECU325, the trajectory creating ECU322 calculates the first target trajectory TR1 considering after recovery from the risk avoidance control. That is, the trajectory creating ECU322 continues to create the first target trajectory TR1 starting from the current status of the vehicle 1 so as to smoothly return to the first target trajectory TR1 after the end of the risk avoidance control. Then, the trajectory following control ECU323 continues to create a first target steering angle OM1 for causing the vehicle 1 to follow the first target trajectory TR1. Hereinafter, this will be described in detail.

When the risk avoidance control is started at time "t", the second target steering angle OM2($t$) is determined so as to return to the original traveling route after avoiding the avoidance object from the position and attitude of the vehicle 1 at time "t". Until the risk avoidance control is released, the vehicle 1 is steered in accordance with the second target steering angle OM2 calculated at each time.

At a time "t+1" which is one step later than the time "t", the first target steering angle OM1($t$+1) is determined so as to return to the original traveling route while avoiding the avoidance object based on the position and the attitude of the vehicle 1 at the time "t+1". Similarly, at time "t+i", the first target steering angle OM1($t$+i) is determined so as to return to the original traveling route while avoiding the avoidance object based on the position and the attitude of the vehicle 1 at time "t+i". Herein, "i" is an integer equal to or greater than 2.

In the example illustrated in FIG. 12, the risk avoidance control is released at time "t+3". After the time "t+3", the vehicle 1 is steered in accordance with the first target steering angle OM1($t$+3). Since the first target steering angle OM1($t$+3) is created to smoothly continue with the second target steering angle OM2($t$), the disturbance in the behavior of the vehicle 1 after the risk avoidance control is released is suppressed by steering in accordance with the first target steering angle OM1($t$+3).

What is claimed is:

1. A vehicle traveling control system for controlling traveling of a vehicle performing automatic operation, comprising:
a fixed electronic control unit (ECU) which operates by one or more programs and is always fixed to the vehicle, wherein,
the fixed ECU is configured to, by execution of the one or more programs:
communicate via a wired in-vehicle network with an automatic operation control system, implemented by a detachable ECU that is detachable from the vehicle and that is fixed to the vehicle when used for drafting a traveling plan of the vehicle, wherein the traveling plan includes a first target trajectory;
perform automatic traveling control for automatically traveling the vehicle along the traveling plan received from the automatic operation control system;
predict a risk based on information on peripheral environment of the vehicle;
execute, when the risk is predicted, a risk avoidance control for intervening in the automatic traveling control in order to avoid the risk; and
transmit, when executing the risk avoidance control, information on the risk avoidance control to the automatic operation control system, implemented by the detachable ECU, wherein the automatic operation control system is prevented from executing an abnormality process when the automatic operation control system determines that the vehicle deviates from the first target trajectory in response to execution of the risk avoidance control, wherein the abnormality process includes switching control of the vehicle to manual operation by stopping the automatic operation.

2. The vehicle traveling control system according to claim 1, wherein:
the fixed ECU is further configured to transmit, when the fixed ECU executes the risk avoidance control, a notification of execution of the risk avoidance control to the automatic operation control system; and the notification of execution of the risk avoidance control is included in the information on the risk avoidance control.

3. The vehicle traveling control system according to claim 1, wherein the abnormality process includes informing the occupant of an abnormality via a human-machine interface (HMI).

4. A vehicle control system comprising one or more in-vehicle sensors which acquire information on peripheral environment of a vehicle, and automatically controlling traveling of the vehicle based on the information obtained from the one or more in-vehicle sensors, the vehicle control system comprising:
 a detachable electronic control unit (ECU) that is detachable from the vehicle and that is fixed to the vehicle when used; and
 a fixed ECU always fixed to the vehicle and configured to communicate with the detachable ECU via a wired in-vehicle network, wherein
 the detachable ECU is configured to execute one or more programs to operate as a traveling plan drafting unit which drafts a traveling plan of the vehicle based on input information including the information obtained from at least one of the one or more in-vehicle sensors, wherein the traveling plan includes a first target trajectory;
 the fixed ECU is configured to execute one or more programs to operate as:
  an automatic traveling control unit which performs an automatic traveling control for automatically traveling the vehicle in accordance with the traveling plan;
  a risk avoidance control unit which predicts risk based on the information obtained from at least one of the one or more in-vehicle sensors, and, performs, when the risk is predicted, a risk avoidance control for intervening in the automatic traveling control in order to avoid the risk, and wherein the risk avoidance control unit, implemented by the fixed ECU communicates, when executing the risk avoidance control, information on the risk avoidance control to the traveling plan drafting unit, implemented by the detachable ECU, wherein the traveling plan drafting unit is prevented from executing an abnormality process when the traveling plan drafting unit determines, based on information obtained from the at least one of the one or more in-vehicle sensors, that the vehicle deviates from the first target trajectory in response to the performance of the risk avoidance control, wherein the abnormality process includes switching control of the vehicle to manual operation by stopping the automatic travelling control.

5. The vehicle control system according to claim 4, wherein:
 the risk avoidance control unit inputs a notification of execution of the risk avoidance control to the traveling plan drafting unit; and
 the notification of execution of the risk avoidance control is included in the information on the risk avoidance control.

6. The vehicle control system according to claim 4, wherein the abnormality process includes informing the occupant of an abnormality via a human-machine interface (HMI).

* * * * *